(12) United States Patent
Farnham

(10) Patent No.: US 8,548,933 B2
(45) Date of Patent: Oct. 1, 2013

(54) OBJECTIVE DECISION MAKING APPLICATION USING BIAS WEIGHTING FACTORS

(75) Inventor: Christopher Farnham, Somerville, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 658 days.

(21) Appl. No.: 12/510,355

(22) Filed: Jul. 28, 2009

(65) Prior Publication Data

US 2010/0023469 A1  Jan. 28, 2010

Related U.S. Application Data

(60) Provisional application No. 61/084,099, filed on Jul. 28, 2008.

(51) Int. Cl.
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 6,408,290 B1 * | 6/2002 | Thiesson et al. | 706/52 |
| 6,853,952 B2 * | 2/2005 | Chadwick | 702/181 |
| 2004/0019575 A1 * | 1/2004 | Talbot et al. | 706/46 |
| 2006/0020568 A1 * | 1/2006 | Cox et al. | 706/52 |
| 2007/0005541 A1 * | 1/2007 | Sadeghi et al. | 706/45 |

* cited by examiner

*Primary Examiner* — Kakali Chaki
*Assistant Examiner* — Mai T Tran
(74) *Attorney, Agent, or Firm* — Barlow, Josephs & Holmes, Ltd.

(57) ABSTRACT

A method and system for implementing a weighted belief network that assists collaborative users in making decisions. A belief network structure is employed that further includes user controlled weighting and biasing factors to adjust the probabilities for the various nodes. The various participants have the opportunity to make adjustments to the weighting and credibility of the evidence and participants in the decision making process in order to arrive at what may be perceived as a more objective outcome. As the collaborative environment is established and the belief network is built, each user can apply various weighting and bias scenarios from their own perspective thereby allowing each discrete user to work out their various suspicions regarding the bias of other participants or the actual weight of a discrete piece of supporting evidence in the context of the entire belief network.

15 Claims, 4 Drawing Sheets

OBJECTIVE DECISION MAKING APPLICATION USING BIAS WEIGHTING FACTORS

CROSS-REFERENCE TO RELATED APPLICATIONS

This application is related to and claims priority from earlier filed U.S. Provisional Patent Application No. 61/084,099, filed Jul. 28, 2008.

BACKGROUND OF THE INVENTION

The present invention relates generally to an application that is employed to structure a collective decision making process. More specifically the present invention relates to a software-implemented structured decision engine that includes real time bias weighting in order to collect input from and provide assistance to a plurality of people involved in a decision making process.

The process of making a decision is an inevitable part of everyday life and the results produced by many decisions may have critical impact on the world around us. While decisions are made every day, some of them are made with great thought while others are made spontaneously. Virtually all of the decisions that we make, however, are within our realm of control and have an effect on the direction that our lives will take and furthermore may have an impact on the world around us. Therefore, for every decision making situation, it is important to make the most informed decision possible with all of the information available at that moment for that situation.

In many decision making situations, the decision rests solely with one actor or with a small group of actors that possess all of the available information in a single location. In these cases, the process is made relatively easy in that there are no unknown pieces of information and all of the actors can meet face-to-face and work through a collaborative discussion to arrive at a decision. However, there are an increasing number of decision making situations where there are a plurality of actors that are all remotely located from one another that must all collaborated to reach a consensus opinion. To facilitate decision making in such environments, there are a number of computer-implemented programs currently available for use in decision making situations in the context of network conferencing, such as teleconferencing, videoconferencing and the like. These programs extend traditional conferencing capabilities to the desktop computer where individuals can participate in conferences from their home or office. In addition, multi-user interaction can be advanced through collaboration management programs that enable data sharing across multiple hardware and software platforms.

Often the software platforms that are employed in such decision collaboration systems are based on belief networks or B-nets. A belief network is a representation of the probabilistic relationships that exist between that various different choices that are available as a solution set to a problem. In this regard, a distinct solution in a belief network can take on a set of values and are thus called variables. A belief network is expressed as an acyclic, directed graph, where the variables correspond to nodes and where the relationships between the nodes correspond to arcs.

When constructing a belief network the participants all provide the entire set of possible solutions that, in their estimation, are available to them for making a given decision. Once the comprehensive solution set is collected, each solution set is established as a node within the belief network. Then, to complete the belief network, an algorithm is employed to gather evidence (both supporting and detracting) and apply that evidence to each of the nodes in a manner that produces dependencies among the nodes and probability distributions that quantify the strengths of the dependencies. This data and the relational evidence collectively serve to create the underlying belief network. After the belief network has been constructed, the belief network becomes the engine for a decision-support system. A computer system then uses the belief network to perform probabilistic inference by determining the probabilities of variable states given observations, to determine the benefits of performing tests, and ultimately to recommend or render a decision.

The difficulty in the use of prior art belief networks in the context of collective decision making is that all of the evidence is equally weighted. In operation, as the users work through the decision making process each of the collaborators adds evidence into the belief network to either support or detract from any particular solution set. While in practice this process may on its face appear ideal, the difficulty is that many times collaborators will come to the process with a predetermined bias or a predetermined concept of their ultimate outcome. As a result in operation these system are generally driven more by egocentricities than by wholly objective evidence.

Therefore, there is a need for a method and system that allows a group of individuals or entities to act as a single decision-making unit in determining whether to implement a course of action. There is a further need for a method and system that can be implemented over a wide area computer network in a manner that allows a group of decision making entities to collaborate in real time in determining whether to implement a course of action. Finally there is still a further need for a method and system that can be implemented over a wide area computer network in a manner that allows a group of decision making entities to collaborate while also allowing each of the entities to be assigned a weighting factor and a bias factor that assists in evaluating their presentation of evidence in the proper context.

BRIEF SUMMARY OF THE INVENTION

In this regard, the present invention provides an improved method and system for implementing a weighted belief network that assists collaborative users in making decisions. The improved method and system of the present invention employs a belief network structure that further includes user controlled weighting and biasing factors to adjust the probabilities for the various nodes. From the standpoint of each of the participants using the system, a decision making process that may be viewed as egocentric or skewed based on particular evidence or based on a highly weighted point of view from a participant can be reweighted to objectify the data or remove the effect of the egocentric data in its entirety. In this manner, the various participants have the opportunity to make adjustments to the weighting and credibility of the evidence and participants in the decision making process in order to arrive at what may be perceived as a more objective outcome.

In accordance with the method and system of the present invention, a belief network is initially formed as would be done in the prior art. The problem to be to evaluated and decided upon is defined and established within the network. All of the potential choices or courses of action are defined and placed into the network as nodes. The participants then add confidence level in the various outcomes by providing statements, evidence and support to or detraction from the outcome possibilities. All of these confidence levels are calculated and updated to create a probabilistic set of relationships that extend between the various possible solution sets. Based on the probabilistic relationships, the collaborative users can interact to make an objective, information based decision.

As was stated above however, participant weighting and bias can serve to skew the model. To account for these issues, the present invention further provides for the inclusion of a weighting and bias factor for each of the participants that in turn serves as a lens through which a particular participant's contributions to the network are viewed or analyzed. Further, the weighting and biasing factors applied by the method and system of the present invention need not be static for any given participant but rather adjusted based on the particular category to which that participant is contributing.

In operation, the method and system of the present invention is directed to a computer implemented system that is established across a wide area network to allow participants to engage with the system from any location throughout the world. Further, however, it should also be appreciated that the present invention could also be implemented using any type of collaborative environment including local area networks, ad hoc networks the Internet and the like. As the collaborative environment is established and the belief network is built, each user can apply various weighting and bias scenarios from their own perspective at their own interface. In this manner, the method and system of the present invention also allows each discrete user to work out their various suspicions regarding the bias of other participants or the actual weight of a discrete piece of supporting evidence in the context of the entire belief network.

It is therefore an object of the present invention to provide a method and system that allows a group of individuals or entities to act as a single decision-making unit in determining whether to implement a course of action. It is a further object of the present invention to provide a method and system that can be implemented over a wide area computer network in a manner that allows a group of decision making entities to collaborate in real time in determining whether to implement a course of action. It is still a further object of the present invention to provide a method and system that can be implemented over a wide area computer network in a manner that allows a group of decision making entities to collaborate while also allowing each of the entities to be assigned a weighting factor and a bias factor that assists in evaluating their presentation of evidence in the proper context.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
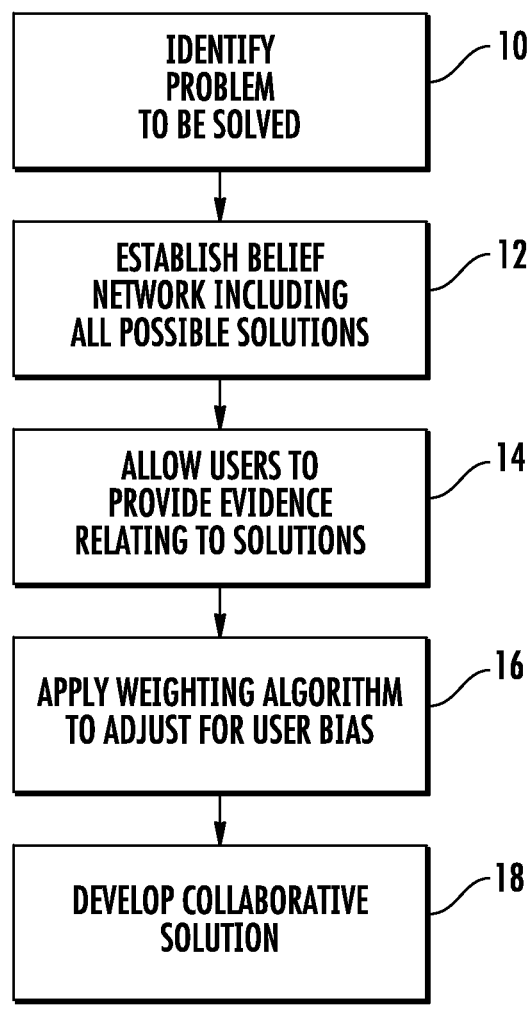
FIG. 1 is a flow chart depicting the operation of the system of the present invention.

Now referring to the drawings, the method and system of the present invention is most generally illustrated in the flow chart at FIG. 1 as an improved decision making system that implements a belief network to assist collaborative users in making decisions. The improved method and system of the present invention generally employs a belief network structure that further includes user controlled weighting and biasing factors to adjust the probabilities for the various nodes. The problem to be solved is identified 10 and a belief network is established using all of the possible solutions 12. Users then enter the belief network to add evidence for or against certain solutions 14. The system acknowledges that from the standpoint of each of the participants using the system, a decision making process is often egocentric or skewed based on particular evidence or based on a highly weighted point of view from a participant. In this manner, the system allows for the belief network to be reweighted via a weighting algorithm 16 to objectify the data or remove the effect of the egocentric data in its entirety. In this manner, the various participants have the opportunity to make adjustments to the weighting and credibility of the evidence and participants in the decision making process in order to arrive at what may be perceived as a more objective outcome 18.

Figure 2:
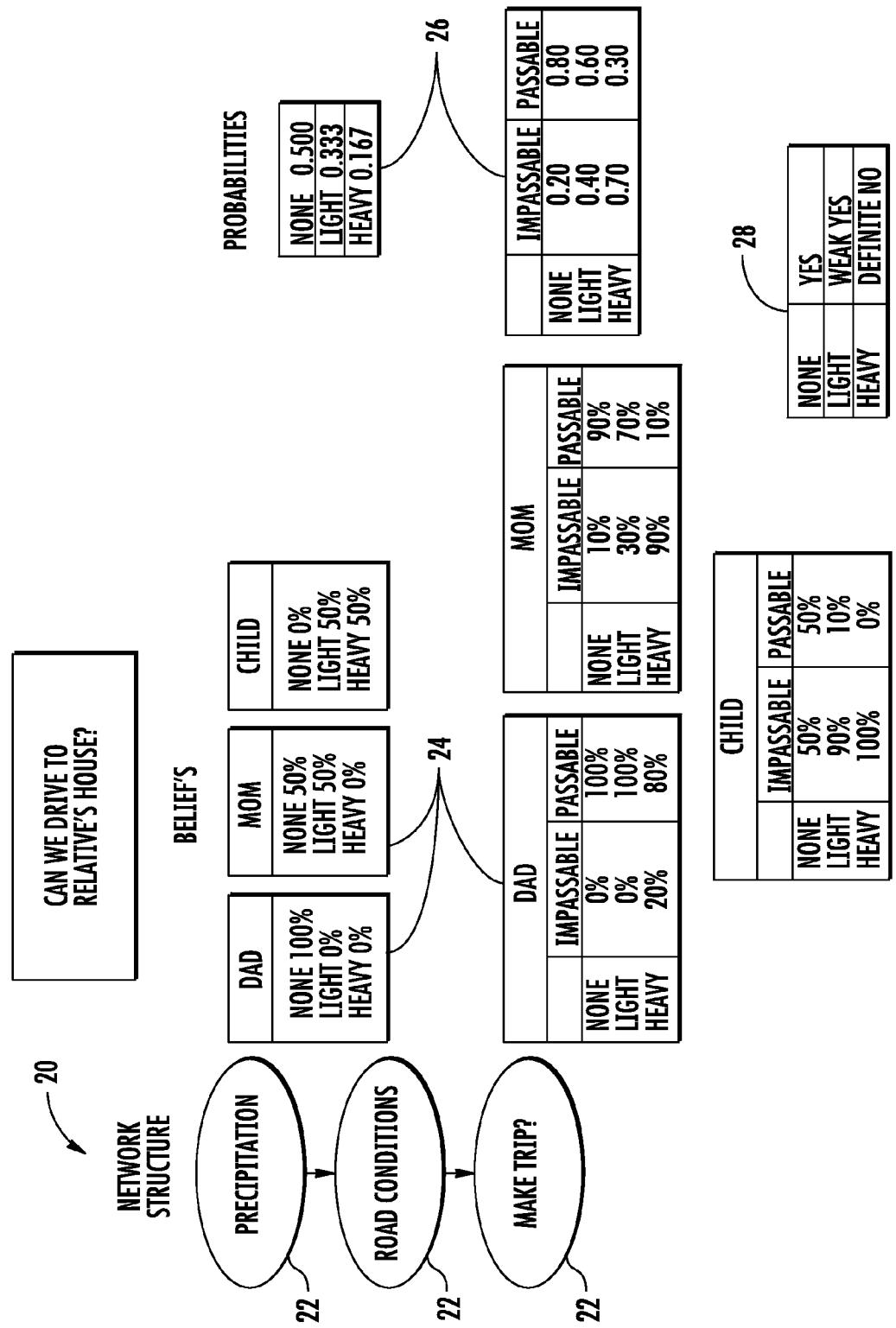
FIG. 2 is a schematic illustration of the operation of the system of the present invention.

As can be seen in FIG. 2, in accordance with the method and system of the present invention, a belief network 20 is initially formed. In establishing the belief network 20, the problem to be to evaluated and decided upon is defined and established within the network. For example, the problem may be whether a family can drive to a distant relative's home given the road conditions. All of the potential choices or courses of action, such as precipitation, the impact of the precipitation on the road conditions and the impact of the road conditions on the decision to make the drive, are defined and placed into the network 20 as nodes 22. The participants then add confidence level in the various outcomes by providing "beliefs" 24 in the form of statements, evidence and support to or detraction from the outcome possibilities. All of these confidence levels are calculated and updated to create a probabilistic set of relationships 26 that extend between the various possible solution sets. Using all of the weighted confidence level probabilities of outcomes, in the case the roads will be passable or impassable, are calculated based on the probabilistic relationships thereby allowing the collaborative users interaction in order to make an objective, information based decision 28.

Figure 3:
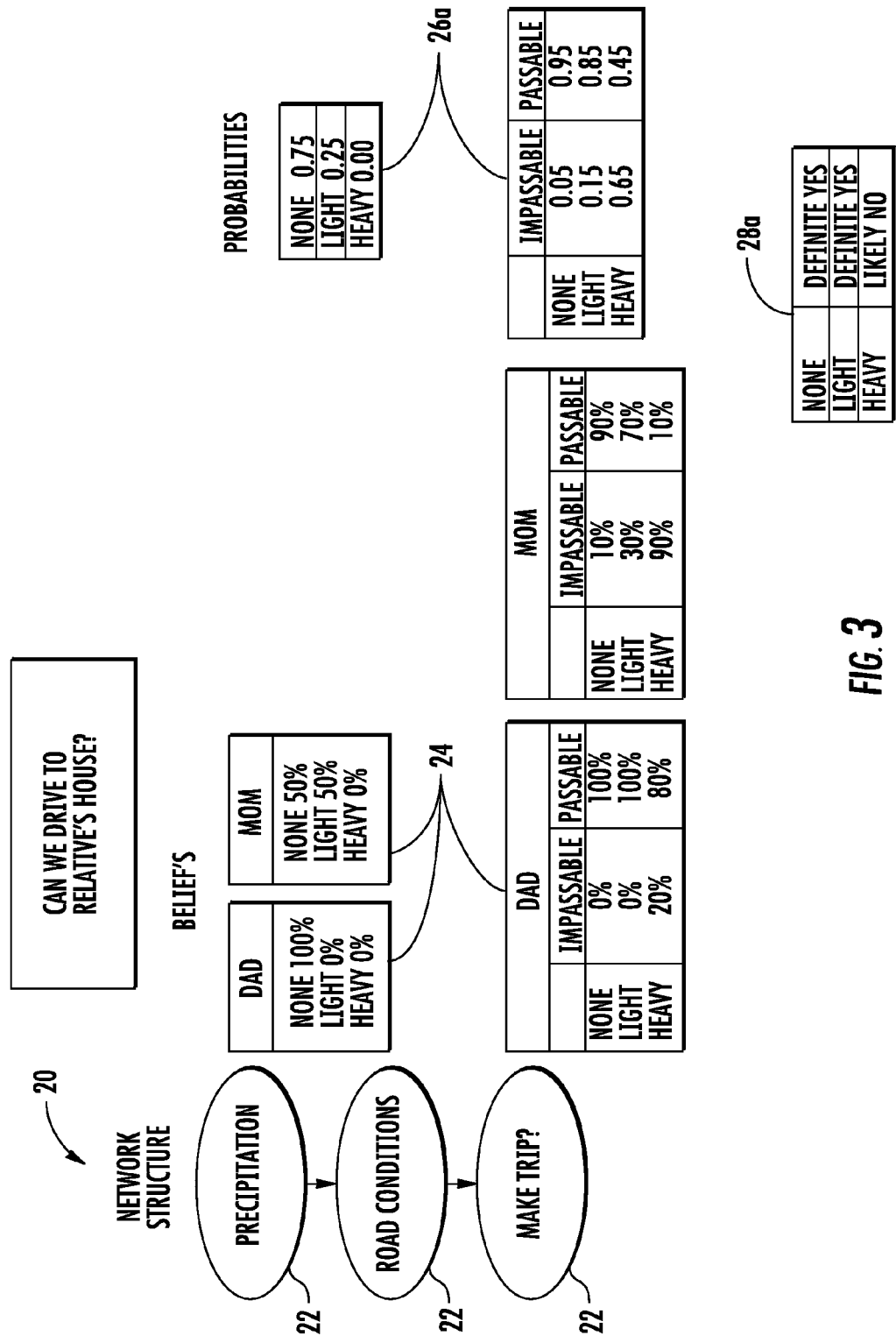
FIG. 3 is a schematic illustration of the operation of the system of the present invention with weighting factors being applied.

As was stated above however, participant weighting and bias can serve to skew the model. To account for these issues, the present invention further provides for the inclusion of a weighting and bias factor, as can be seen in FIG. 3, for each of the participants that in turn serves as a lens through which a particular participant's contributions to the network are viewed or analyzed. Further, the weighting and biasing factors applied by the method and system of the present invention need not be static for any given participant but rather adjusted based on the particular category to which that participant is contributing. In this example, it is believed that since the child thinks a visit to the relative's house is more excruciating than a dentist visit it is likely that the child is biased against making the trip and will therefore weight all factors that provide evidence against making the trim more highly. Accordingly, in order to determine the impact that the child's beliefs are having on the outcome within the network, they have been removed from the system. The system then recalculates the probabilities 26a and evidences that in the worst case where the precipitation is heavy the outcome remains the same while in the moderate case of light precipitation the outcome 28a changes from a borderline yes to a definite yes in favor of making the trip.

It should be noted in this example that while a weighting scenario has been depicted in an all of nothing manner where the child's input is either fully valued or fully removed, the system also provides for partial weighting with a sliding scale using any real number weighting factor from zero to one. Further, it is anticipated in the present invention that the analysis system will be depicted in a graphic fashion on a interactive computer display wherein users can toggle and/or adjust data using sliders for example to manipulate the analysis and apply or remove bias factor weightings.

In another example, in making a decision to close a remote office in a global business, it is clear that managers who reside at that remote location and are charged with running that office clearly have a predisposed bias against closing that location. However, that bias does not necessarily mean that all input from those participants must be dismissed since, despite the bias, those participants may have expertise in the effect that the closure may have on inventory handling or a particular local real estate condition that may prevent sale of the building. In this situation, the method and system of the present invention allows a biasing factor to be assigned to the participant that may reduce the impact of their input outside their areas of particular expertise while also allowing a weighting factor to be assigned to those categories in which their particular knowledge is of a high value. For example, their beliefs may be reduced in weighting by 20%, thereby allowing their input to impact the decision process by 80%.

Figure 4:
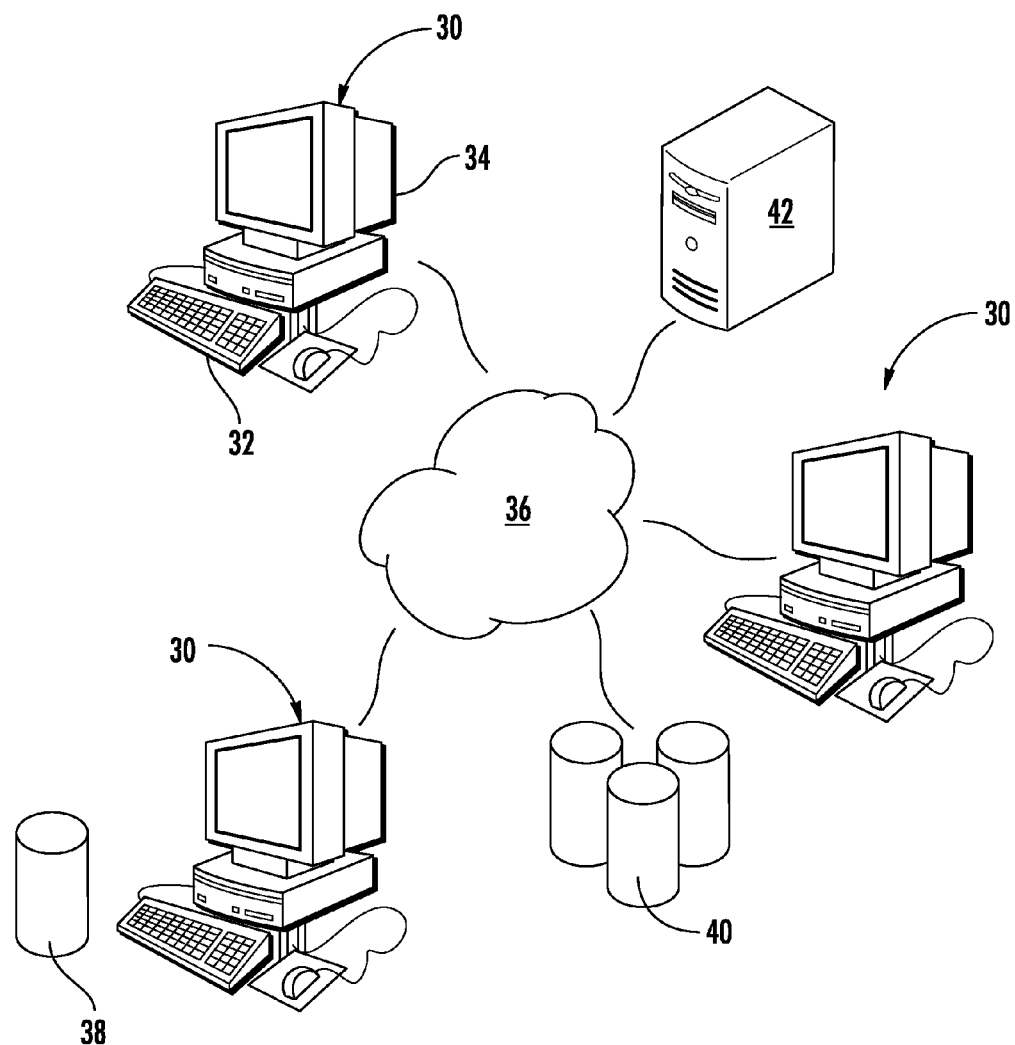
FIG. 4 is a schematic illustration of a system for implementation of the method of the present invention.

In operation, as depicted schematically at FIG. 4, the method and system of the present invention is directed to a computer implemented system that employs at least a computer 30 having a processer 32 therein and a display device 34. More preferably, the system employs a plurality of computers 30 that are connected across a wide area network 36 to allow participants to engage with the system from any location throughout the world. Further, there may be local data storage 38 at each of the computers 30 or central data storage 40 on the wide area network 36. Still further, the system may be deployed on each computer 30 locally, on a single computer 30 that is accessed by all of the other computers 30 via the wide area network 36 or on a dedicated processor 42 such that the system is accessed and operated across the wide area network 36. It should also be appreciated that the present invention could also be implemented using any type of collaborative environment including local area networks, ad hoc networks the Internet and the like. As the collaborative environment is established and the belief network is built, each user can apply various weighting and bias scenarios from their own perspective at their own interface. In this manner, the method and system of the present invention also allows each discrete user to work out their various suspicions regarding the bias of other participants or the actual weight of a discrete piece of supporting evidence in the context of the entire belief network.

In another context, the method and system of the present invention may be employed for the control of a decision related to a remote military strike. The participants in the decision making process may include various military officers in the chain of command, intelligence gathering agents and individual soldiers on the front line. In such an environment, it can be appreciated that superior weighting is generally accorded to participants based on their relative position in the chain of command. However, biasing factors may also be employed based on the category of knowledge being contributed to the building of the network. For example, only the soldier has first hand knowledge of the actual whether conditions in front of them or the presence of civilians around the target. Similarly, intelligence agents may know of upcoming target movement. In these areas, those participants having a higher expertise of intrinsic knowledge would be accorded a higher bias weighting. Further, participants can interactively adjust these bias weightings in real time to determine the overall effect that any particular piece of information is having on the network itself.

It can therefore be seen that the method and system of the present invention provides a method and system that allows a group of individuals or entities to collaborate in real time in order to act as a single decision-making unit in determining whether to implement a course of action. Further the method and system of the present invention can be implemented over a wide area computer network in a manner that allows a group of decision making entities to collaborate while also allowing each of the entities to be assigned a weighting factor and a bias factor that assists in evaluating their presentation of evidence in the proper context. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A collaborative decision making system, comprising:
a communication network;
at least two user interfaces connected to said communication network; and
a decision making process accessed by users via said user interfaces, said decision making process performed by an algorithm that operates to:
identify a problem to be solved;
identify a plurality of possible outcomes for said problem to be solved;
structure said plurality of possible outcomes into a belief network;
solicit evidence from said users relating to said outcomes;
generate a probability table containing a conditional probability based on said evidence for each of the possible outcomes wherein beliefs in the confidence level of an outcome is obtained from each user and entered in said probability table; and
apply a selective weighting factor to add or remove from consideration evidence based on a discrete user that submitted the evidence to adjust the conditional probability for each of the possible outcomes.

2. The system of claim 1, wherein said weighting factor is a real number between 0 and 1.

3. The system of claim 1, wherein said weighting factor is a user determined value that adjusts the weight given to the evidence submitted by a selected user.

4. The system of claim 1, wherein the user interface includes a display wherein said decision making system is graphically displayed and said weighting factor is adjusted by a user using a graphic user interface.

5. The system of claim 1, wherein said at least two user interfaces are a plurality of user interfaces allowing a plurality of users to access said decision making process.

6. The system of claim 1, wherein the communication network is the Internet.

7. The system of claim 1, wherein said algorithm operates on one of said user interfaces.

8. The system of claim 1, wherein said algorithm operates on a processor connected to said communication network.

9. A computer implemented method for collaborative decision making, comprising:
- identifying a problem to be solved;
- identifying a plurality of possible outcomes for said problem to be solved;
- structuring said plurality of possible outcomes into a belief network, said belief network residing on a computer processor in communication with an electronic communication network;
- soliciting evidence from a plurality of users relating to said outcomes, said users inputting said evidence via a user interface in communication with said electronic communication network;
- said processor generating a probability table containing a conditional probability based on said evidence for each of the possible outcomes wherein evidence in the form of beliefs in the confidence level of an outcome is obtained from each user and entered in said probability table; and
- said users applying a selective weighting factor to add or remove from consideration evidence based on a discrete user that submitted the evidence to adjust the conditional probability for each of the possible outcomes.

10. The method of claim 9, wherein said weighting factor is a real number between 0 and 1.

11. The method of claim 9, wherein each user can selectively apply a weighting factor to adjust the weight given to any of said evidence submitted by any of said plurality of users.

12. The method of claim 9, wherein the communication network is the Internet.

13. The method of claim 9, wherein said computer implemented method is a software application that operates on one of said user interfaces.

14. The method of claim 9, wherein said computer implemented method is a software application that operates on a processor connected to said communication network.

15. The method of claim 9, wherein the user interface includes a display wherein said decision making system is graphically displayed and said weighting factor is adjusted by a user using a graphic user interface.

* * * * *